United States Patent Office 3,304,179
Patented Feb. 14, 1967

3,304,179
DIGLYCOLALDEHYDE HARDENING AGENT FOR GELATIN
George Terence James Field, Chadwell Heath, Essex, and Patrick Robinson Huddleston, Ilford, Essex, England, assignors to May & Baker Limited, Essex, England, a British company
No Drawing. Filed Nov. 4, 1964, Ser. No. 408,775
Claims priority, application Great Britain, Nov. 8, 1963, 44,262/63
10 Claims. (Cl. 96—61)

This invention relates to the hardening of gelatin, especially of coatings containing gelatin as used in photography.

Certain aldehydes have been previously described in the literature as being useful for the hardening of gelatin coatings as used in photography. Until recent years the most widely mentioned material of this type was formaldehyde, which is extremely active as a hardening agent. Formaldehyde, however, exhibits undesirable photographic properties and is, moreover, toxic. It also has a detrimental effect on certain photographic developing agents. In consequence, it has been found to be desirable to replace formaldehyde by some other effective hardenin agent. Glyoxal has also been used as hardening agent for gelatin but glyoxal is not as effective as formaldehyde in hardening gelatin. In addition it is unstable and its presence in developing solutions is not normally to be desired.

In more recent years it has been claimed (British Patent No. 825,544) that effective hardening of gelatin can be obtained without the disadvantages associated with formaldehyde and glyoxal by the use of a dialdehyde, in which the aldehyde groups are separated by an open hydrocarbon chain containing two or three carbon atoms, optionally substituted by at least one alkyl or alkoxy group, and alkali metal bisulphite addition compounds of the said dialdehydes. Specific examples of this class of dialdehyde that have been proposed as hardening agents for gelatin are glutaric dialdehyde, β-methylglutaric dialdehyde, maleic dialdehyde, succinic dialdehyde and methoxysuccinic dialdehyde.

We have now found that diglycolaldehyde of the formula:

$$OHC \cdot CH_2—O—CH_2 \cdot CHO \qquad (I)$$

and its alkali metal bisulphite addition compounds are more efficient as hardening agents for gelatin than the previously described dialdehydes and are more stable on storage in developer solutions. Hence, when the hardening effect of diglycolaldehyde is compared with that of glutaric dialdehyde and β-phenylglutaric dialdehyde when used in a typical photographic developer formulation (A) consisting of:

| | G. |
|---|---|
| Hydroquinone | 12.7 |
| 1-phenyl-3-pyrazolidone | 0.32 |
| Sodium metabisulphite | 28.0 |
| Potassium bromide | 2.7 |
| Benzotriazole | 0.145 |
| Ethylenediamine tetracetic acid | 3.0 |
| Potassium hydroxide to pH 10.2. | |
| Water up to 1 litre. | | the following results were obtained:

TABLE I

| Dialdehyde used | Time of Treatment at 40° C. in seconds | G./litre of dialdehyde in formulation (A) required to raise melting point of gelatin from 40° C. to 100° C. |
|---|---|---|
| Glutaric dialdehyde | 120 | 0.48 |
| β-Phenylglutaric dialdehyde | 120 | 1.40 |
| Diglycolaldehyde | 120 | 0.16 |

TABLE II

| Dialdehyde used | Time of treatment at 40° C. in seconds | Amount of dialdehyde used in formulation (A), g./litre | Swelling index of gelatin after processing (undried) |
|---|---|---|---|
| Glutaric dialdehyde | 90 | 5.0 | 60 |
| β-Phenylglutaric dialdehyde | 90 | 14.6 | 65 |
| Diglycolaldehyde | 90 | 1.65 | 60 |
| None (unhardened developer) | 90 | None | 100 |

These results show that diglycolaldehyde is about 3 timse as efficient as glutaric dialdehyde in hardening gelatin and some 8–10 times as efficient for this purpose as β-phenylglutaric dialdehyde.

The greater stability of diglycolaldehyde when stored in developer solutions can be seen by reference to the following figures:

TABLE III.—DECOMPOSITION OF GELATIN HARDENING AGENT IN DEVELOPER SOLUTION ON STORAGE FOR 10 DAYS AT pH 10.2 AND 40° C.

| Dialdehyde | Percent loss of dialdehyde |
|---|---|
| Glutaric dialdehyde (added as bisulphite adduct) | 43 |
| β-Phenylglutaric dialdehyde (added as bisulphite adduct) | 56 |
| Diglycolaldehyde (added as aldehyde) | 38 |

It is to be noted that diglycolaldehyde, which is present in the form of its bisulphite adduct formed in situ in the developer solution, is more stable on storage under these conditions than either of the bisulphite adducts derived from glutaric dialdehyde or β-phenylglutaric dialdehyde.

Aqueous concentrates of both diglycolaldehyde and the sodium bisulphite derivative of diglycolaldehyde possess high storage stability, concentrates of both compounds containing 25% w./v. equivalent of free aldehyde having been found to be completely stable for periods up to 6 months at 40° C.

According to a feature of the invention, diglycolaldehyde of Formula I or an alkali metal bisulphite derivative thereof is employed as a hardening agent for gelatin, for example in coatings of photographic emulsions. These hardening agents may be incorporated in aqueous solutions or other coating compositions containing gelatin, e.g. photographic emulsions, or incorporated into aqueous or other bath solutions with which the gelatin coating is treated such as in photographic processing baths, e.g. in photographic developer solutions, prehardener baths and non-acidic fixing baths when they become incorporated in the gelatin coating; such compositions including diglycolaldehyde or alkali metal bisulphite derivative thereof are included within the scope of this invention.

Diglycolaldehyde and alkali metal bisulphite derivatives thereof do not give rise to undesired effects when incorporated in a photographic developer solution. This is clearly demonstrated by the following experimental results:

TABLE IV.—EXPERIMENT 1—EFFECT OF DIGLYCOLALDEHYDE ON SENSITOMETRIC PROPERTIES OF DEVELOPER

| Developer | Fog and Base | Relative speed at density 1.0 above fog and base | Contrast |
| --- | --- | --- | --- |
| Control | 0.18 | 100 | 2.4 |
| Hardening Developer | 0.20 | 100 | 2.2 |

In experiment 1, results of which are summarised in Table IV, standard X-ray film was developed for 120 seconds at 40° C. Control developer was a standard developer containing hydroquinone and 1-phenyl-3-pyrazolidone. The hardening developer was the standard developer plus 1.65 g./litre of diglycolaldehyde.

TABLE V.—EXPERIMENT 2—COMPARATIVE EFFECT OF DIGLYCOLALDEHYDE AND GLUTARIC DIALDEHYDE ON SENSITOMETRIC PROPERTIES OF DEVELOPER.

| Developer | Fog and Base | Relative speed at density 1.0 above fog and base | Contrast |
| --- | --- | --- | --- |
| Control | 0.18 | 100 | 2.4 |
| Hardening Developer (diglycolaldehyde) (a) | 0.20 | 100 | 2.2 |
| Hardening Developer (glutaric dialdehyde) (b) | 0.23 | 100 | 2.1 |

In experiment 2 results of which are summarised in Table V, high speed X-ray film was developed for 120 seconds at 40° C. Control developer was a standard developer containing hydroquinone and 1-phenyl-3-pyrazolidone. The hardening developers were (a) the standard developer plus 4.0 g./litre of diglycolaldehyde and (b) the standard developer plus 4.0 g./litre of glutaric dialdehyde. It will be observed that the above results show that diglycolaldehyde compares favourably in its photographic effects to glutaric dialdehyde, a widely used hardening agent.

Diglycolaldehyde has also been found to be more rapid in its hardening action than the known hardening agents formaldehyde and glutaric dialdehyde. The following table summarises the results obtained when aqueous solutions of diglycolaldehyde, formaldehyde and glutaric dialdehyde are added to aqueous solutions containing gelatin of PH 7 at 50° C.

emulsions. In addition to being useful in non-colour sensitized emulsions, they may also be used in orthochromatic, panchromatic and X-ray emulsions. If used with sensitizing dyes, they may be added to the emulsion before or after addition of the dye.

Various silver salts may be used as the photosensitive salt such as silver bromide, silver iodide, silver chloride or mixed silver halides. Diglycolaldehyde or one of its alkali metal bisulphite derivatives may be used in emulsions intended for colour photography; for example, emulsions containing colour-forming couplers or emulsions to be developed by solutions containing couplers. It is to be understood that emulsions to which other addenda have been included, such as stabilizers and sensitizers, are usually susceptible to hardening with diglycolaldehyde as described herein.

The alkali metal bisulphite derivatives of diglycolaldehyde are preferred to the free aldehyde in certain circumstances. For example, the sodium bisulphite addition compound is the preferred form for addition to alkaline developer solutions, in which it has high stability, because it does not effectively reduce the free bisulphite content of the developer solution as is the case when a free aldehyde is added; effective reduction in the free bisulphite content of the developer solution causes variation in pH, which affects the effectiveness of both the hardener and the developing agents necessitating an alteration in their concentration to maintain that required, and also increases the risk of deterioration of the developer solution caused by aerial oxidation.

It must be understood that, throughout the present specification, where reference is made to "free bisulphite," this term refers also to free sulphite and sulphite/bisulphite equilibrium mixtures which may be present according to the pH of the solution.

The sodium bisulphite derivative of diglycolaldehyde is very soluble both in water and in aqueous solutions containing free bisulphite up to saturation. This high solubility, particularly in bisulphite-containing solutions, represents a considerable advantage over the sodium bisulphite derivatives of glutaric and β-phenylglutaric dialdehydes which are much less soluble in water and aqueous bisulphite-containing solutions. The sodium bisulphite derivatives of glutaric and β-phenylglutaric dialdehydes are insufficiently soluble in water to enable satisfactory aqueous concentrates to be obtained, while the use of concentrates in the form of aqueous solutions of the more readily water-soluble free dialdehydes requires the addition of further quantities of sodium metabisulphite to developer solutions to which the hardeners are added to compensate for the removal of free bisulphite by the dialdehydes. The high solubility of the sodium bisulphite derivative of diglycolaldehyde, however, makes it possible to prepare aqueous hardener solutions containing both hardener and bisulphite in the form of concentrates containing up to 25% w./v. equivalent of free aldehyde.

TABLE VI

| Dialdehyde | Quantity used per gram of gelatin (gram) | Length of time necessary for gelification | |
| --- | --- | --- | --- |
| | | Aqueous solution containing 2.5% by weight of gelatin | Aqueous solution containing 3% by weight of gelatin |
| Diglycolaldehyde | 0.061 | Gelification after about 2 minutes. | Immediate gelification. |
| Formaldehyde | 0.075 | No gelification after 2 hours. | Gelification after about 60 minutes. |
| Glutaric dialdehyde | 0.062 | Gelification after about 10 minutes. | Immediate gelification. |

According to the present invention, diglycolaldehyde, or an alkali metal bisulphite derivative thereof, may be used as hardening agent in various kinds of photographic emulsions.

The sodium bisulphite derivative of diglycolaldehyde is also stable in acid solutions. The hardening agents for gelatin coatings provided by the present invention exert their action on such coatings under acid, alkaline or neutral conditions. Hardening of gelatin takes place readily at temperatures between 15° to 50° C. (60°–120° F.) at pH values of the hardening solution between 8.5 and 12.0. Alkalies such as alkali metal carbonates, sodium sesquicarbonate, borax, sodium metaborate, sodium metasilicate, trisodium phosphate or an alkali metal hydroxide may be used in the adjustment of pH values without deleterious effect on the hardeners of the present invention.

Gelatin hardened with diglycolaldehyde or an alkali metal bisulphite derivative thereof is relatively free from surface case hardening as compared with formaldehyde hardened gelatin, and reticulation is less pronounced.

The hardening of the gelatin layer is determined by taking its melting point when in contact with an aqueous bath. For instance, the melting point of a gelatin layer which has not been hardened, in contact with water, is ordinarily within the range of from 30° to 35° C., whereas gelatin coatings hardened in accordance with our invention usually exhibit a melting point of at least 100° C.

When used according to the present invention as hardening agents for gelatin by incorporation into gelatin compositions such as photographic emulsions, diglycolaldehyde or an alkali metal bisulphite derivative thereof is normally utilised at rates of 0.5 to 3% by weight (in terms of the free aldehyde) of the gelatin composition but larger amounts of hardener may be incorporated if desired. When used according to the present invention as hardening agents for gelatin coatings, such as coatings of photographic emulsions, by incorporation into aqueous or other bath solutions in which the gelatin coating is treated, such as in photographic processing baths, particularly in photographic developer solutions, prehardener baths and non-acidic fixing baths, the quantities of diglycolaldehyde or its alkali metal bisulphite derivatives incorporated into the bath solutions may be varied according to the amount of hardening desired, the duration of the time and the temperature of treatment of the gelatin layer and, particularly in the case of photographic developer solutions, the pH value of the bath solution. It is normally desirable to use a concentration of at least 0.2 gram per litre of hardener (in terms of the free aldehyde) in the bath solution, particularly good results being obtained with photographic processing solutions containing 1.5 to 4 grams per litre of hardener (in terms of the free aldehyde), especially with alkaline developer solutions. Higher concentrations may, however, be used if required.

As will be apparent to those skilled in the art, diglycolaldehyde and its alkali metal bisulphite derivatives may also be utilised as hardeners for gelatin for purposes other than photographic, for example gelatin capsules and other pharmaceutical presentation forms. Such uses and the products so obtained from further features of the present invention.

Diglycolaldehyde of Formula I may be prepared by hydrolysis of a corresponding tetra-acetal, for example an acetal of the formula:

$$(RO)_2 \cdot CH \cdot CH_2 - O - CH_2 \cdot CH \cdot (OR)_2 \quad (II)$$

wherein R represents a methyl or ethyl group, with an acid (preferably aqueous acetic acid) or by means of an ion-exchange resin. The tetra-acetal of Formula II may itself be prepared by the reaction of an alkali metal derivative of the formula:

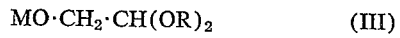

$$MO \cdot CH_2 \cdot CH(OR)_2 \quad (III)$$

(wherein R is as hereinbefore defined and M represents a sodium or potassium atom) with a halogenated acetal of the formula:

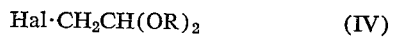

$$Hal \cdot CH_2 CH(OR)_2 \quad (IV)$$

wherein R is as hereinbefore defined, and Hal represents a chlorine or bromine atom. The compounds of Formula III may be prepared from the corresponding alcohol by reaction with an alkali metal, i.e. with sodium or potassium metal, or sodium or potassium hydride in an inert organic solvent, for example toluene. Hydroxyacetaldehyde diethyl or dimethyl acetal may be conveniently prepared by hydrolysis of a corresponding halogenated compound of Formula IV with aqueous potassium hydroxide in an autoclave at 130° C.

Diglycolaldehyde may be converted to one of its alkali metal bisulphite derivatives according to methods known per se, for example the sodium bisulphite derivative may be prepared by reaction of an aqueous solution of diglycolaldehyde with an aqueous solution containing an equimolecular proportion of sodium bisulphite and evaporating to dryness, followed, if necessary, by the removal of the last traces of water by the addition of ethanol and removal of the water/ethanol azeotrope by evaporation.

The alkali metal bisulphite derivatives of diglycolaldehyde are new compounds not heretofore isolated or described in the chemical literature and form, together with their aqueous and aqueous-organic solutions, further features of the present invention.

The following Examples I to IV illustrate the preparation of diglycolaldehyde and its alkali metal bisulphite derivatives.

Example I

Chlorodiethyl acetal (200 gm.), potassium hydroxide (130 gm.) and water (3.75 litre) were heated together at 130–135° C. for 40 hours in a rocking autoclave. After cooling, the autoclave contents were saturated with potassium carbonate and the upper layer separated. The lower layer was extracted three times with diethyl ether and the organic layer was combined with ethereal extracts and dried over anhydrous potassium carbonate. The mixture was filtered and the filtrate distilled to give glycolaldehyde diethylacetal (105.7 g.; 60%), B.P. 82–88° C./30 mm., $n_D^{20}$ 1.4155.

A sodium hydride dispersion (18.4 gm. of a 53% suspension in oil) was suspended in dry toluene (940 ml.) and glycolaldehyde diethyl acetal (56 ml.) was added portion-wise with stirring. When effervescence had ceased the mixture was reffuxed with stirring for 1 hour. Bromodiethyl acetal (79.2 gm.) was then added and the mixture was stirred and refluxed for 15 hours. After this time, the liquid was cooled, the solid which separated filtered off and the filtrate evaporated under reduced pressure to remove the toluene. The residual liquid was then distilled to give diglycolaldehyde tetraethyl acetal (50.8 gm.; 51%), B.P. 150–155° C./30 mm. Hg.

Diglycolaldehyde tetraethyl acetal (2.5 g.) was suspended in water (25 ml.) and glacial acetic acid (0.75 ml.) was added. The mixture was refluxed for ½ hour to give a homogenous solution (containing about 1 gm. of diglycolaldehyde). This solution is suitable for use as a hardening solution.

Example II

Diglycolaldehyde tetraethyl acetal (2.5 g.) (prepared as described in Example I) was suspended in water (25 ml.) and a little (about 0.1 g.) Amberlite IR 120 ion-exchange resin (H+ form) added. The mixture was then refluxed for half an hour. The solution was filtered to remove resin particles, giving a solution containing approximately 1 g. of diglycolaldehyde in 27 ml. of water/ethanol mixture. (This solution is suitable for use as a hardening solution.) Sodium metabisulphite (1.9 g.) was then added to the filtered solution and the resulting solution taken to dryness in a rotary evaporator in vacuo. This procedure is then twice repeated upon the product obtained after treatment, each time, with ethanol (20 ml. portions). The sodium bisulphite derivative of diglycolaldehyde (2.9 g.) is thus obtained as a crisp white solid. When dissolved in water, a sample of this product gives a cloudy solution owing to the presence of traces of mineral oil from the sodium hydride suspension used in the preparation of the sodium derivative of glycolaldehyde diethyl acetal. A product giving a much clearer solution in water is obtained by twice triturating with dioxan to remove the mineral oil traces.

Procceeding in a similar manner, but commencing with an equivalent amount of potassium meta-bisulphite, the potassium bisulphite derivative of diglycolaldehyde may be obtained in the form of a crisp white solid.

*Example III*

A mixture of chlorodimethyl acetal (206 g.), potassium hydroxide pellets (187.5 g.) and water (3.75 litres) was shaken in an autoclave for 24 hours at 130° C. The mixture was then cooled, saturated with potassium chloride and continuously extracted with diethyl ether for 3 days. The ethereal solution was dried over magnesium sulphate, the diethyl ether removed by evaporation and the residue distilled under reduced pressure, giving glycolaldehyde dimethyl acetal (97.7 g.) in the form of a colorless mobile liquid, B.P. 60–65° C./11–14 mm. Hg.

A mixture of glycolaldehyde dimethyl acetal (prepared as described above; 208.5 g.) and dry toluene (600 ml.) was heated to reflux and sodium metal (46 g.) added portion-wise with stirring during the course of about 1 hour. Chlorodimethyl acetal (227 ml.) was then added and the mixture stirred under reflux for 3 hours. The mixture was then cooled to laboratory temperature, water (500 ml.) added and the layers separated. The aqueous layer was then extracted with toluene (200 ml.) and the combined toluene solutions dried over magnesium sulphate, and filtered. Toluene was then removed from the filtrate by evaporation on a water bath under reduced pressure and the residue distilled in vacuo, giving diglycoaldehyde tetramethyl acetal (224 g.), B. P. 97–101° C./10 mm. Hg, as a colourless mobile liquid.

A further quantity (34 g.) of diglycolaldehyde tetramethyl acetal was obtained by saturating the aqueous layer from the toluene extraction with potassium chloride, continuously extracting with diethyl ether for 24 hours and evaporating the ethereal solution obtained.

Diglycolaldehyde tetramethyl acetal (60 g.) was mixed with water (60 ml.) and a small quantity (5 g.) of Amberlite IR 120-ion-exchange resin (H+ form) added. The mixture was stirred under reflux for 45 minutes, the resin filtered off and washed with methanol and the combined filtrate and methanol washings fractionated through a 10 inch Widmer column to remove methanol. When this process was complete the distillation residue was diluted with water to a volume of 100 ml., giving a solution suitable for use as a hardener, the assay of which showed it to contain 27.5% w./v. of diglycolaldehyde. The water/methanol solution obtained during the above preparation before fractionation is also suitable for use as a hardener.

*Example IV*

Diglycolaldehyde tetramethyl acetal (prepared as described in Example III; 107 g.) was dissolved in water (150 ml.) and Amberlite IR 120 ion-exchange resin (H+ form) (5 g.) was added. After refluxing for 45 minutes, cooling, the resin was filtered off and washed with water. Sodium metabisulphite (105 g.) was added to the combined filtrate and washings. After standing overnight, the solution was filtered through Hyflo and concentrated to a volume of 200 ml. giving a solution suitable for use as a hardener, the assay of which showed it to have a 44.5% w./v. content of the sodium bisulphite derivative of diglycolaldehyde.

According to a further feature of the present invention, there is provided a new method for the preparation of diglycolaldehyde which is more convenient, involving fewer stages, than the methods commencing with haloacetals heretofore disclosed in the literature and described above, which comprises the ozonolysis of 2,5-dihydrofuran followed by decomposition of the ozonolysis product obtained. Ozonolysis may be effected in an inert liquid organic medium such as a lower alkyl ester, for example ethyl acetate or a chlorinated hydrocarbon, for example methylene chloride, but is preferably carried out in a lower alkanol, such as methanol or ethanol. The use of a lower alkanol as reaction medium is preferred because its presence tends to suppress the possible formation of polymeric by-products which may otherwise occur. Reaction is preferably carried out at a temperature below 0° C., particularly when a lower alkanol is used as the reaction medium, when reaction is preferably effected at a temperature below that at which attack on the alkanol by ozone is likely to occur. When methanol is used, reaction is preferably carried out at, or below, −20° C. and more particularly at −20° C. to −70° C. Decomposition of the ozonolysis product to give diglycolaldehyde may be effected by treatment with a tri-lower alkyl phosphite, such as triethyl phosphite, or sulphur dioxide or by catalytic hydrogenation. The diglycolaldehyde obtained may be converted into an alkali metal bisulphite derivative as hereinbefore described. The ozonolysis product may also be decomposed by the addition of an excess of an alkali metal bisulphite, giving the alkali metal bisulphite derivative of diglycolaldehyde directly.

The following example illustrates the new process of the present invention.

*Example V*

2,5-dihydrofuran (1.8 g.) was dissolved in methanol (50 ml.) in a vessel provided with a sintered glass inlet tube. A current of oxygen (dried by passage through concentrated sulphuric acid), such that it gave a reading of 200 ml./minute on a flowmeter calibrated for air, was passed through an ozonizer (Tack Model L.03) and the effluent gas passed into the above solution cooled to approximately −70° C. in a solid carbon dioxide/acetone bath. The gas leaving the ozonolysis vessel initially contained no ozone but after about one hour much ozone could be detected, by starch/K1 paper, in the effluent gas. The ozonizer was then turned off and the oxygen flow continued to remove dissolved ozone. When the gas leaving the ozonlysis vessel again gave a negative test for ozone, the oxygen flow was discontinued. The contents of the ozonolysis vessel then gave a strongly positive test result for peroxides with starch/K1 paper. Triethyl prosphite (7 ml.) was then added to the ozonolysis vessel in the cooling bath. After a few minutes the temperature rose to −10° C. and fell again. After a further 5 minutes in the cooling bath the contents of the vessel gave no colour with starch/Kl paper and were allowed to come to laboratory temperature giving a solution suitable for use as a hardener.

Diglycolaldehyde may be isolated from this solution in the form of the 2,4-dinitrophenylhydrazone by addition to a solution of 2,4-dinitrophenyl-hydrozine (10 g.) in methanol (100 ml.) containing concentrated sulphuric acid. A precipitate immediately forms and the mixture is heated almost to boiling and allowed to cool. After standing for half an hour at laboratory temperature and for a further half an hour in an ice bath, the orange precipitate is collected. After washing with methanol, water and again with methanol the solid is dried in vacuo, giving diglycolaldehyde bis-2,4-dinitrophenylhydrazone (8.6 g.), sintering at about 174° C. and melting at about 180° C. Recrystallization from nitromethane (100 ml.) raises this melting point to 195–197° C.

We claim:
1. A method of hardening gelatin which comprises incorporating a member of the class consisting of diglycolaldehyde and alkali metal bisulphite derivatives thereof with the gelatin.
2. A method according to claim 1 wherein the amount of diglycolaldehyde incorporated with the gelatin is 0.5% to 3% by weight of the gelatin.
3. A method according to claim 2 wherein the gelatin is in the form of a gelatin-silver halide photographic emulsion.

4. Aqueous photographic developer solutions, containing at least 0.2 gram per litre of a member of the class consisting of diglycolaldehyde and alkali metal bisulphite derivatives thereof.

5. A photographic gelatin prehardening solution comprising a member of the class consisting of diglycolaldehyde and the sodium bisulphite derivatives thereof and water, the solution containing from 0.2 gram per litre up to 25% weight/volume of free aldehyde, and having a pH of between 8.5 and 12.0.

6. A non-acidic photographic fixing solution containing at least 0.2 gram per litre of a member of the class consisting of diglycolaldehyde and alkali metal bisulphite derivatives thereof.

7. A method of developing and hardening an exposed photographic gelatin emulsion layer which comprises treating the layer with an aqueous photographic developer solution containing at least 0.2 gram per litre of a member of the class consisting of diglycolaldehyde and alkali metal bisulphite derivatives thereof.

8. A method of hardening a layer of gelatin which comprises treating the layer with an aqueous gelatin hardening solution containing at least 0.2 gram per litre of a member of the class consisting of diglycolaldehyde and alkali metal bisulphite derivatives thereof.

9. A method of fixing and hardening a developed photographic gelatin emulsion layer which comprises treating said emulsion layer with an aqueous non-acidic fixing solution containing at least 0.2 gram per litre of a member of the class consisting of diglycolaldehyde and alkali metal bisulphite derivatives thereof.

10. A method of prehardening an exposed photographic gelatin emulsion layer which comprises treating said emulsion layer with an aqueous gelatin hardening solution containing at least 0.2 gram per litre of a member of the class consisting of diglycolaldehyde and alkali metal bisulphite derivatives thereof.

References Cited by the Examiner

UNITED STATES PATENTS

| | | | |
|---|---|---|---|
| 2,553,506 | 5/1951 | Mueller et al. | 96—111 |
| 2,726,162 | 12/1955 | Allen et al. | 96—111 |

FOREIGN PATENTS 825,544    12/1959    Great Britain.

OTHER REFERENCES

Bielstein, F. K.: Handbuch der Organischen Chemie, Third Supplement, vol. I, part 3, page 3183.

NORMAN G. TORCHIN, *Primary Examiner.*

C. E. DAVIS, *Assistant Examiner.*